US010154161B2

(12) United States Patent
Lee et al.

(10) Patent No.: US 10,154,161 B2
(45) Date of Patent: Dec. 11, 2018

(54) IMAGE FORMING APPARATUS DETERMINING SUPPLIES-PURCHASING CONDITION BASED ON USAGE OF SUPPLIES AND OPERATING METHOD THEREOF

(71) Applicant: S-Printing Solution Co., Ltd., Suwon-si, Gyeonggi-do (KR)

(72) Inventors: Jae-yoon Lee, Seongnam-si (KR); Hong-rok Woo, Yongin-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 62 days.

(21) Appl. No.: 15/293,875

(22) Filed: Oct. 14, 2016

(65) Prior Publication Data

US 2018/0020104 A1 Jan. 18, 2018

(30) Foreign Application Priority Data

Jul. 14, 2016 (KR) .......................... 10-2016-0089209

(51) Int. Cl.
*G06Q 10/08* (2012.01)
*H04N 1/00* (2006.01)

(52) U.S. Cl.
CPC ....... *H04N 1/00323* (2013.01); *G06Q 10/087* (2013.01); *H04N 1/0009* (2013.01); *H04N 1/00034* (2013.01); *H04N 2201/0094* (2013.01)

(58) Field of Classification Search
CPC .......... H04N 1/00323; H04N 1/00034; H04N 1/0009; G06Q 10/087
USPC ................................................ 358/1.15, 1.16
See application file for complete search history.

(56) References Cited

U.S. PATENT DOCUMENTS

| 7,315,700 | B2 | 1/2008 | Kim et al. | |
|---|---|---|---|---|
| 2002/0194064 | A1* | 12/2002 | Parry | G06Q 30/02 705/14.24 |
| 2006/0034625 | A1* | 2/2006 | Kajikawa | G03G 21/181 399/12 |
| 2016/0173284 | A1* | 6/2016 | Jeran | G03G 21/1892 713/180 |

FOREIGN PATENT DOCUMENTS

KR 10-0574036 B1 4/2006

* cited by examiner

*Primary Examiner* — Eric A. Rust
(74) *Attorney, Agent, or Firm* — Jefferson IP Law, LLP (57) ABSTRACT

An image forming apparatus and an operating method thereof are provided. The image forming apparatus uses supplied mounted therein, and includes at least one computer processor configured to determine a grade of the image forming apparatus based on an accumulated usage of the supplies, and determine a range of available grades of the supplies, based on the determined grade of the image forming apparatus, and a memory configured to store information about the grade of the image forming apparatus.

17 Claims, 9 Drawing Sheets

| VERSION | MODEL NAME | CURRENT GRADE OF IMAGE FORMING APPARATUS | TOTAL NUMBER OF GRADES | BRONZE GRADE REFERENCE VALUE | SILVER GRADE REFERENCE VALUE | GOLD GRADE REFERENCE VALUE |
|---|---|---|---|---|---|---|
| 2.0 | ABC1234 | silver | 3 | 0 | 30000 | 50000 |

IMAGE FORMING APPARATUS DETERMINING SUPPLIES-PURCHASING CONDITION BASED ON USAGE OF SUPPLIES AND OPERATING METHOD THEREOF

CROSS-REFERENCE TO RELATED APPLICATION(S)

This application claims the benefit under 35 U.S.C. § 119(a) of a Korean patent application filed on Jul. 14, 2016 in the Korean Intellectual Property Office and assigned Serial number 10-2016-0089209, the entire disclosure of which is hereby incorporated by reference.

TECHNICAL FIELD

The present disclosure relates to an image forming apparatus and an operating method thereof. More particularly, the present disclosure relates to a method of classifying an image forming apparatus based on a usage of supplies and differentially applying a supplies-purchasing condition, and an image forming apparatus for performing the method.

BACKGROUND

Manufacturers of products such as an image forming apparatus formed of a device and supplies make profits by selling the device to users and continually selling the supplies. However, due to the emergence of fraudulent supplies (not authorized by the manufacturers) distributed at a lower expense than genuine supplies (authorized by the manufacturers), the profits of the manufacturers have been decreasing.

In order to suppress the distribution of the fraudulent supplies and increase the sales of genuine supplies, the following methods have been used previously. First, a method of preventing copying by mounting a crypto-chip in the genuine supplies has been used. However, this method has problems including large expenses for developing technology and components of a crypto-chip, misrecognition of genuine supplies as fraudulent supplies via a device, and possible copying of the crypto-chip due to the development of reverse engineering technology. Second, a method of not guaranteeing the quality of supplies or blocking the usage of supplies after a predetermined lifespan by restricting a guaranteed life span of the supplies has been used. However, this method is restrictedly applied to products due to environmental organizations and related regulations. Third, a method of giving a benefit to a purchaser frequently using genuine supplies by adopting a mileage program has been used. However, the mileage program is not cost effective in terms of expenses for establishing and maintaining a service system, and it is hard to prevent side effects that an individual distributor, such as a dealer or purchasing personnel, may obtain all of the mileage by purchasing a large quantity of supplies.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of determining a grade of an image forming apparatus based on a usage of supplies and differentially applying a supplies-purchasing condition based on the grade of the image forming apparatus, and an image forming apparatus for performing the method.

In accordance with an aspect of the present disclosure, an image forming apparatus using supplies mounted in the image forming apparatus is provided. The image forming apparatus includes at least one computer processor (e.g., controller) configured to determine a grade of the image forming apparatus based on an accumulated usage of the supplies, and determine a range of available grades of the supplies, based on the determined grade of the image forming apparatus, and a memory configured to store information about the grade of the image forming apparatus.

The at least one computer processor may further be configured to determine the grade of the image forming apparatus based on the accumulated usage and pre-stored apparatus grade classification information.

The accumulated usage may be calculated by using a ratio of an accumulated number of dots that are used in the supplies to a number of dots used in 5% pattern printing, or by using a ratio of the accumulated number of dots that are used in the supplies to the number of dots representing a total capacity of the supplies.

The at least one computer processor may further be configured to determine a wider range of available grades of the supplies, as the determined grade of the image forming apparatus increases.

In accordance with another aspect of the present disclosure, a method of an image forming apparatus using supplies mounted in the image forming apparatus is provided. The operating method includes determining a grade of the image forming apparatus based on an accumulated usage of the supplies, determining a range of available grades of the supplies, based on the determined grade of the image forming apparatus, and storing information about the grade of the image forming apparatus.

In accordance with another aspect of the present disclosure, a non-transitory computer-readable recording medium is provided. The non-transitory computer-readable recording medium has recorded thereon a program comprising commands, which when executed by a computer, performs a method including determining a grade of the image forming apparatus based on an accumulated usage of the supplies, determining a range of available grades of the supplies, based on the determined grade of the image forming apparatus, and storing information about the grade of the image forming apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

In this specification, "an image forming job" may denote various operations (e.g. printing, scanning, or faxing) related to an image, such as forming of an image or generating/storing/transmitting of an image file, and the "job" may denote not only the image forming job but also a series of processes necessary for performing the image forming job.

Also, "an image forming apparatus" may denote all devices capable of performing an image forming job, such as a printer, a scanner, a fax machine, a multi-function printer (MFP), or a display device.

"A hard copy" may denote an operation of outputting an image on a printing medium, such as paper, etc., and "a soft copy" may denote an operation of outputting an image on a display device, such as a television (TV), a monitor, etc.

"Content" may denote all types of data which may be an object of the image forming job, such as a picture, an image, or a document.

"Print data" may denote data converted into a format which is printable by a printer.

"A scan file" may denote a file generated by scanning an image via a scanner.

"A user" may denote a person performing manipulation related to the image forming job by using the image forming apparatus or a device connected by wire or wirelessly to the image forming apparatus. Also, "a manager" may denote a person having the right to access every function and system of the image forming apparatus. The "manager" and the "user" may be the same person.

Hereinafter, the present disclosure will be described in detail by referring to the accompanying drawings.

Figure 1:
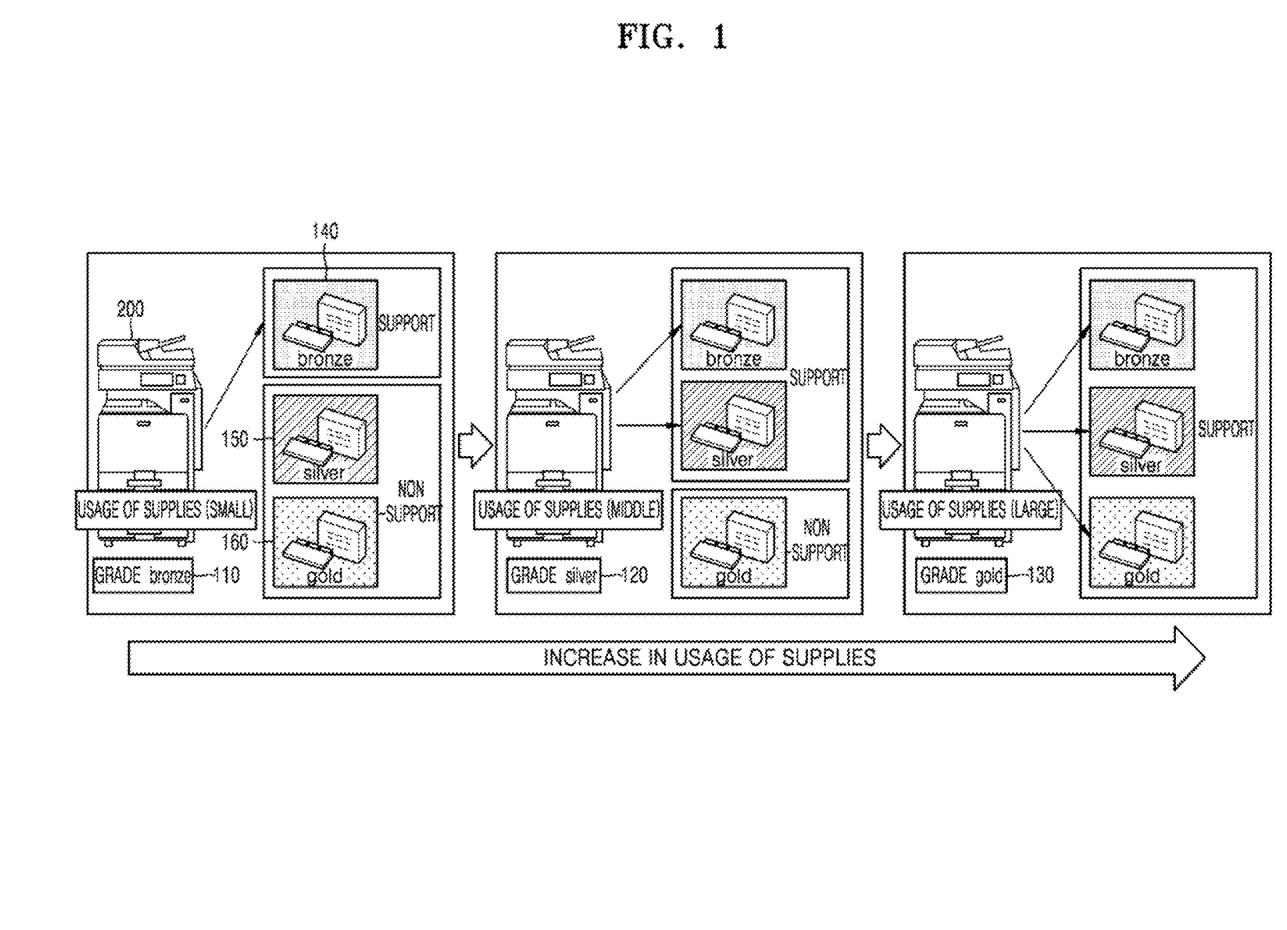
FIG. 1 illustrates a change of a grade of an image forming apparatus according to an increase of accumulated usage of supplies according to an embodiment of the present disclosure.

FIG. 1 illustrates a change of a grade of an image forming apparatus according to an increase of accumulated usage of supplies according to an embodiment of the present disclosure.

In this specification, the term "grade" may denote the classification for differently applying a supplies-purchasing condition, and a characteristic, a property, or a type of the image forming apparatus or the supplies is not changed according to "a grade of an image forming apparatus" or "a grade of supplies". For example, when the grade of an image forming apparatus is high, high grade supplies may be mounted in the image forming apparatus for use, wherein the high grade supplies may be less expensive than low grade supplies or may have a greater total capacity than the low grade supplies.

According to an embodiment of the present disclosure, an image forming apparatus 200 may determine a grade of the image forming apparatus 200 based on an accumulated usage of supplies. For example, the image forming apparatus 200 may have a bronze grade 110 when the image forming apparatus 200 is initially purchased. Then, as the accumulated usage of supplies increases, the image forming apparatus 200 may be determined to have a silver grade 120 or a gold grade 130.

According to an embodiment of the present disclosure, the image forming apparatus 200 may determine a range of available grades of supplies, based on the determined grade of the image forming apparatus 200. Here, the grade of supplies may denote a purchasing condition of supplies.

Referring to FIG. 1, when the image forming apparatus 200 has the bronze grade 110, supplies of a bronze grade 140 may be mounted for use in the image forming apparatus 200. (That is, a user may purchase for use only the supplies of the bronze grade 140, via a supplies-purchasing condition corresponding to the bronze grade 110.) When the image forming apparatus 200 has the silver grade 120, supplies of the bronze grade 140 or a silver grade 150 may be mounted for use in the image forming apparatus 200. When the image forming apparatus 200 has the gold grade 130, supplies of the bronze grade 140, the silver grade 150, or a gold grade 160 may be mounted for use in the image forming apparatus 200. (That is, the user may purchase all of the supplies of the bronze grade 140, the silver grade 150, and the gold grade 160, via a supplies-purchasing condition corresponding to the gold grade 130).

According to an embodiment of the present disclosure, as the supplies have a higher grade, expenses of the supplies may decrease. For example, expenses of the supplies of the bronze grade 140, which is the lowest grade in FIG. 1, may be the highest, and expenses of the supplies of the gold grade 160, which is the highest grade in FIG. 1, may be the lowest.

Alternatively, as the supplies have the higher grade, a capacity of the supplies may increase. For example, a capacity of the supplies of the bronze grade 140, which is the lowest grade in FIG. 1, may be the smallest, and a capacity of the supplies of the gold grade 160, which is the highest grade in FIG. 1, may be the largest.

The image forming apparatus 200 may determine the range of available grades of the supplies, based on the determined grade of the image forming apparatus 200, as described above. However, embodiments of the present disclosure are not limited thereto. According to an embodiment of the present disclosure, the image forming apparatus 200 may provide more benefit information to the user as the determined grade of the image forming apparatus 200 increases. For example, when the image forming apparatus 200 has the silver grade 120, the image forming apparatus 200 may provide a 30% discount coupon to discount a cost for purchasing the image forming apparatus to the user, and when the image forming apparatus 200 has the gold grade 130, the image forming apparatus 200 may provide a 50% discount coupon to discount a cost for purchasing the image forming apparatus to the user. Types of benefit information which may be provided to the user are not limited thereto.

Meanwhile, the terms for dividing the grades of the image forming apparatus 200 or the supplies, the number of grades of the image forming apparatus 200 or the supplies, etc. are not limited to the case exemplified in FIG. 1.

Figure 2:
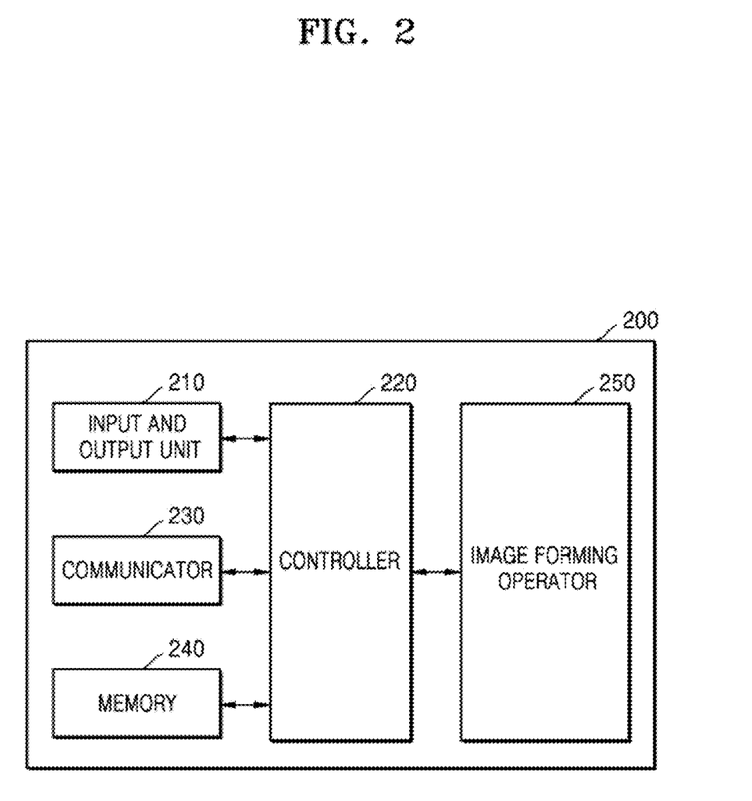
FIG. 2 is a block diagram of a structure of an image forming apparatus according to an embodiment of the present disclosure.

FIG. 2 is a block diagram that illustrates a structure of the image forming apparatus 200 according to an embodiment of the present disclosure.

Referring to FIG. 2, the image forming apparatus 200 according to the present embodiment may include an input and output unit 210, a controller 220 (e.g., at least one computer processor), a communicator 230, a memory 240, and an image forming operator 250. Also, although it is not illustrated, the image forming apparatus 200 may further include a power supply for supplying power to each of the components.

The input and output unit 210 may include an input unit for receiving, from a user, an input for executing an image forming job, etc. and an output unit for displaying a result of executing the image forming job, or information of a state of the image forming apparatus 200, etc. For example, the input and output unit 210 may include an operational panel for receiving a user's input and a display panel for displaying a screen.

In detail, the input unit may include devices via which various types of user inputs may be received, such as a keyboard, a physical button, a touch screen, a camera, a microphone, and the like. Also, the output unit may include, for example, a display panel, a speaker, and the like. However, the input unit and the output unit are not limited thereto, and the input and output unit 210 may include devices for supplying various input and outputs.

The controller 220 may control a general operation of the image forming apparatus 200 and may include a processor, such as a central processing unit (CPU). The controller 220 may control other components of the image forming apparatus 200 such that the components may perform operations corresponding to a user's input received via the input and output unit 210.

For example, the controller 220 may execute a program stored in the memory 240, read a file stored in the memory 240, or store a new file to the memory 240.

The communicator 230 may perform wired and wireless communication with other devices or a network. To this end, the communicator 230 may include a communication module for supporting at least one of various wired and wireless communication methods. For example, the communication module of the communicator 230 may be a chipset type or may be a sticker/barcode (e.g. a sticker including a near field communication (NFC) tag) including information necessary for communication.

The wireless communication may include, for example, at least one of Wi-Fi, Wi-Fi direct, Bluetooth (BT), ultra-wideband (UWB), and NFC. The wired communication may include, for example, at least one of universal serial bus (USB) and high definition multimedia interface (HDMI).

Figure 3:
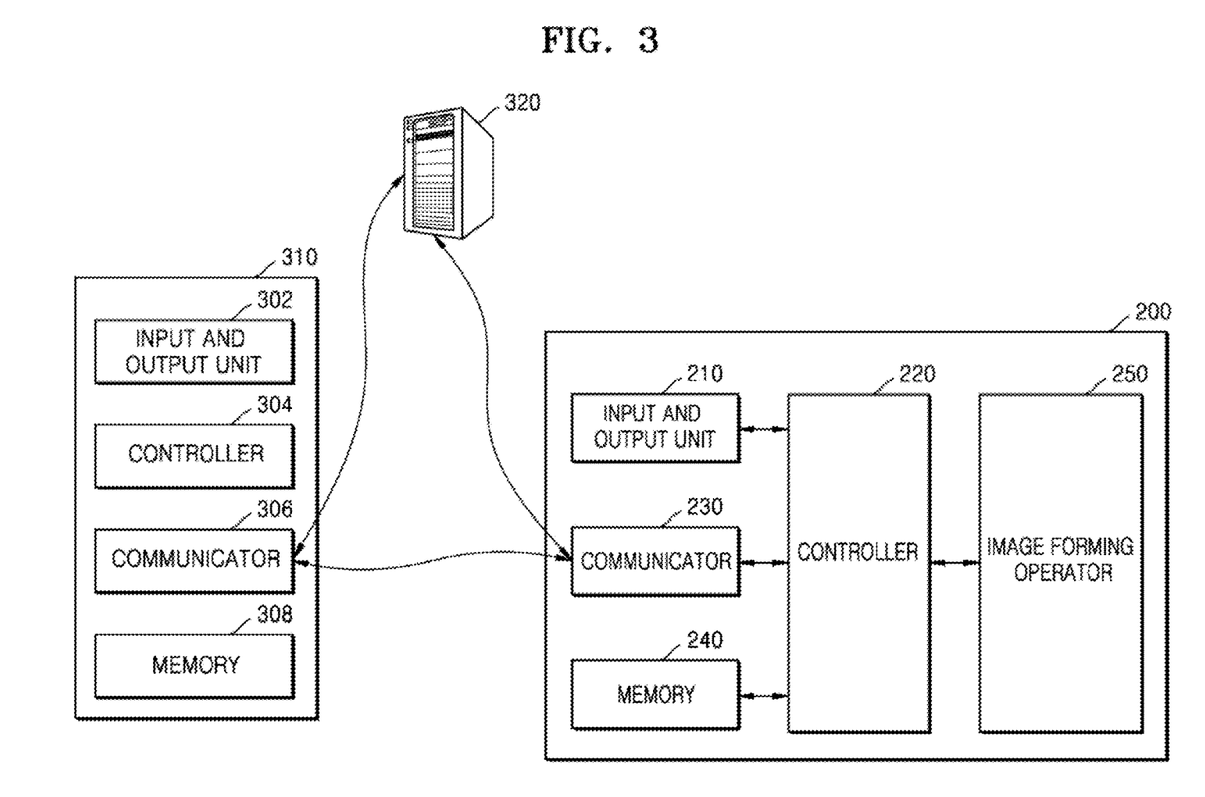
FIG. 3 illustrates communication among an image forming apparatus, an external device, and a server according to an embodiment of the present disclosure.

The communicator 230 may be connected to an external device located outside the image forming apparatus 200 to exchange a signal or data with the external device. Referring to FIG. 3, the image forming apparatus 200 is connected to an external device 310 via the communicator 230. The communicator 230 may transmit a signal or data received from the external device 310 to the controller 220, or may transmit a signal or data generated by the controller 220 to the external device 310. For example, when the communicator 230 receives a print command signal and print data from the external device 310, the controller 220 may output the received print data via a printing unit (not shown in FIG. 2, included in the image forming operator 250).

Further referring to FIG. 2, programs such as applications and various types of data such as files may be installed and stored in the memory 240. The controller 220 may access and use the data stored in the memory 240, or may store new data to the memory 240. Also, the controller 220 may execute the programs installed in the memory 240. Also, the controller 220 may install an application received from the outside via the communicator 230, in the memory 240.

The image forming operator 250 may perform an image forming job, such as printing, scanning, faxing, etc. According to an embodiment of the present disclosure, the image forming operator 250 may include a printer, a scanner, and a fax unit, and according to necessity, only some of these components may be included in the image forming operator 250, or other components for performing other types of image forming jobs may further be included in the image forming operator 250.

FIG. 3 illustrates communication among the image forming apparatus 200, the external device 310, and a server 320 according to an embodiment of the present disclosure.

Referring to FIG. 3, the external device 310 may include an input and output unit 302, a controller 304 (e.g., at least one computer processor), a communicator 306, and a memory 308. The controller 304 may control an image forming job by executing a program stored in the memory 308 and transmitting a signal or data generated as a result of executing the program to the image forming apparatus 200 via the communicator 306. The external device 310 may include, for example, smartphones, tablet computers, personal computers (PCs), household appliances, medical devices, cameras, wearable devices, etc.

The communicator 230 may be directly connected to the server 320 and exchange a signal or data with the server 320.

Also, the communicator 230 may be connected to the external device 310 via the server 320. That is, the communicator 230 of the image forming apparatus 200 may exchange a signal or data with the communicator 306 of the external device 310 via the server 320.

According to an embodiment of the present disclosure, the image forming apparatus 200 may transmit information of at least one of an accumulated usage of supplies and a grade of an image forming apparatus to at least one of the server 320 and the external device 310. In more detail, the communicator 230 may transmit the information of at least one of the accumulated usage of supplies and the grade of the image forming apparatus to the at least one of the server 320 and the external device 310. At least one of the server 320 and the external device 310 may autonomously store the received information and when the image forming apparatus 200 requests the information, may transmit the information to the image forming apparatus 200.

Figure 4:
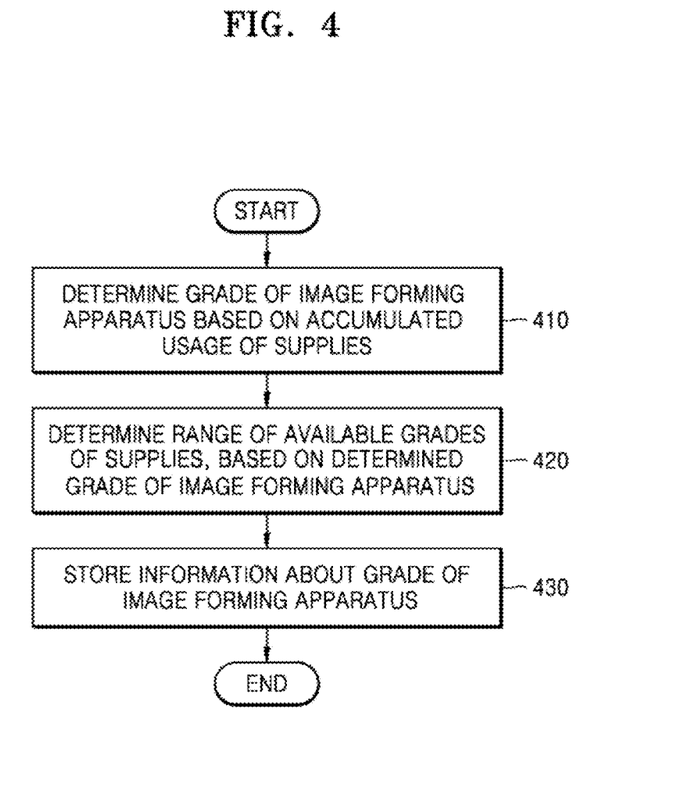
FIG. 4 is a flowchart of an operating method of an image forming apparatus according to an embodiment of the present disclosure.

FIG. 4 is a flowchart of an operating method of the image forming apparatus 200 according to an embodiment of the present disclosure.

At operation S410, the image forming apparatus 200 may determine a grade thereof based on an accumulated usage of supplies. In more detail, the controller 220 may determine the grade of the image forming apparatus 200 based on the accumulated usage of supplies.

According to an embodiment of the present disclosure, the image forming apparatus 200 may add both a usage of genuine supplies and a usage of fraudulent supplies to the accumulated usage. Here, for example, a user of the fraudulent supplies may purchase the genuine supplies at a low expense, when the grade of the image forming apparatus 200 rises because the usage of the fraudulent supplies has accumulated. A decreased expense of the genuine supplies provides a cause for the user of the fraudulent supplies to be converted into a user of the genuine supplies.

Alternatively, the image forming apparatus 200 may add only the usage of genuine supplies to the accumulated usage. In this case, the grade of the image forming apparatus 200 does not rise, regardless of how frequently the user of the fraudulent supplies has used the fraudulent supplies, and thus, the user of the fraudulent supplies may not use the genuine supplies of a high grade and may not get a benefit based on the rising grade of the image forming apparatus 200. Accordingly, even in the case in which only the usage of genuine supplies is added to the accumulated usage, there may be a cause for the user of the fraudulent supplies to be converted into a user of the genuine supplies.

At operation S420, the image forming apparatus 200 may determine a range of available grades of supplies, based on the determined grade of the image forming apparatus 200. In more detail, the controller 220 may determine the range of available grades of the supplies, based on the determined grade of the image forming apparatus 200.

At operation S430, the image forming apparatus 200 may store information about the grade of the image forming apparatus 200. In more detail, the memory 240 may store the information about the grade of the image forming apparatus 200.

According to an embodiment of the present disclosure, the memory 240 may store at least one of the accumulated usage of supplies and the range of available grades of the supplies, in addition to the information about the grade of the image forming apparatus 200, and it is not limited thereto.

Figure 5:
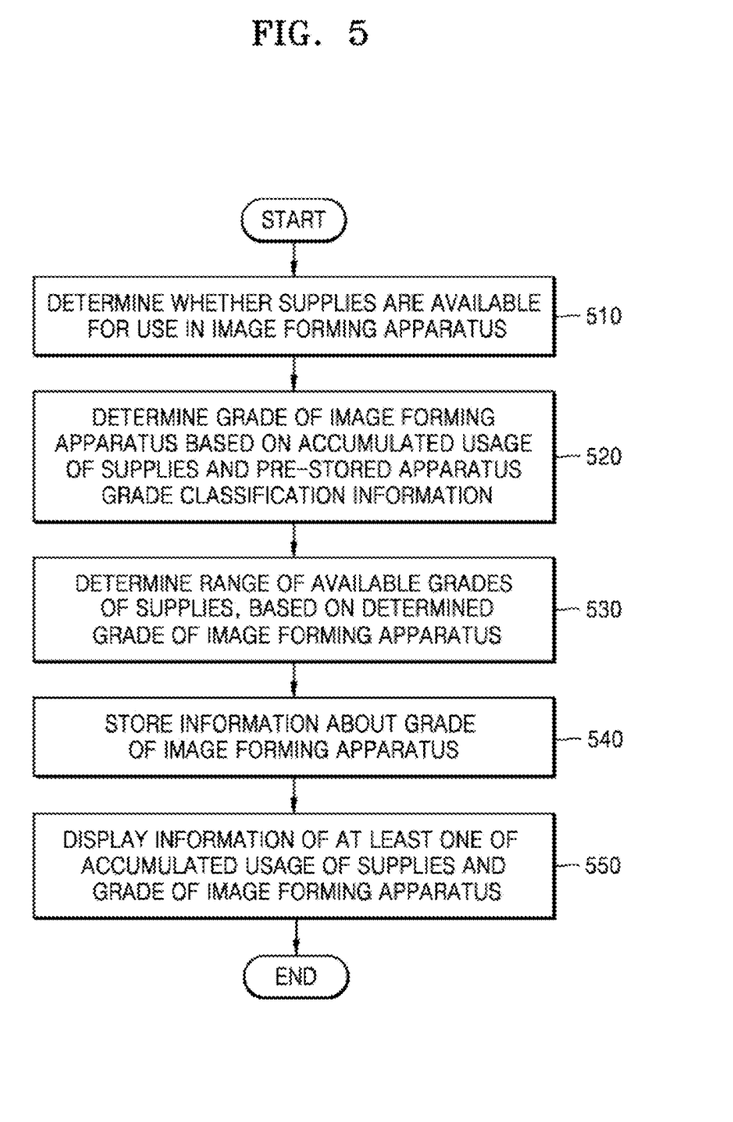
FIG. 5 is a flowchart of an operating method of an image forming apparatus according to an embodiment of the present disclosure.

FIG. 5 is a flowchart of an operating method of the image forming apparatus 200 according to an embodiment of the present disclosure.

At operation S510, the image forming apparatus 200 may determine whether supplies are available for use in the image forming apparatus 200. In more detail, the controller 220 may determine whether the supplies are available for use in the image forming apparatus 200.

According to an embodiment of the present disclosure, the image forming apparatus 200 may determine whether supplies are available for use in the image forming apparatus 200 by comparing model information of image forming apparatuses which are compatible with the supplies with model information of the image forming apparatus 200. For example, when the model information of the image forming apparatus 200 is included in the model information of the image forming apparatuses compatible with the supplies, the image forming apparatus 200 may determine that the supplies are available for use in the image forming apparatus 200.

Also, the image forming apparatus 200 may determine whether the supplies are available for use in the image forming apparatus 200 by determining whether the supplies are genuine supplies or fraudulent supplies. For example, there may be case in which fraudulent supplies mounted in the image forming apparatus 200 are not available for use, due to the restriction of the manufacturer. Here, the image forming apparatus 200 may determine whether the supplies mounted in the image forming apparatus 200 are genuine supplies or fraudulent supplies to determine whether the supplies are available for use in the image forming apparatus 200.

Also, the image forming apparatus 200 may determine whether the supplies are available for use in the image forming apparatus 200 by receiving information about a grade of the supplies. For example, when the image forming apparatus 200 receives the information that the supplies mounted in the image forming apparatus 200, which currently has the bronze grade 110, have the silver grade 150, the image forming apparatus 200 may determine that the mounted supplies are not available for use.

Alternatively, when the user purchases supplies at a supplies purchasing site by using at least one of the image forming apparatus 200 and the server 320, when the user tries to purchase the supplies not in conformity with a supplies purchasing condition corresponding to the grade of the image forming apparatus 200, the server 320 may prevent the user's purchase of the supplies. For example, when a user of the image forming apparatus 200 having the silver grade 120 tries to purchase supplies of the gold grade 160 at a supplies purchasing site by using the image forming apparatus 200 and the server 320, the server 320 may not acknowledge the user's purchase of the supplies in order to prevent the purchase of the supplies not in conformity with the supplies purchasing condition.

At operation S520, the image forming apparatus 200 may determine the grade of the image forming apparatus 200 based on an accumulated usage of supplies and pre-stored apparatus grade classification information. In more detail, the controller 220 may determine the grade of the image forming apparatus 200 based on the accumulated usage of supplies and the pre-stored apparatus grade classification information.

In this specification, the term "the apparatus grade classification information" denotes information including a reference value for classifying the grade of the image forming apparatus based on the accumulated usage of supplies. For example, information that the reference value of the bronze grade 110 is 0, the reference value of the silver grade 120 is 30000, and the reference value of the gold grade 130 is 50000 may be included in the apparatus grade classification information. A unit of the reference value may vary according to a unit of the usage of supplies, and an example of the unit of the usage of supplies will be described later by referring to FIG. 6. The information included in the apparatus grade classification information is not limited to the reference value for classifying the grade of the image forming apparatus based on the accumulated usage of supplies, and may include information of a version of the image forming apparatus, a model name of the image forming apparatus, and the total number of grades.

At operation S530, the image forming apparatus 200 may determine the range of available grades of the supplies, based on the determined grade of the image forming apparatus 200. In more detail, the controller 220 may determine the range of available grades of the supplies, based on the determined grade of the image forming apparatus 200.

At operation S540, the image forming apparatus 200 may store information about the grade of the image forming apparatus 200. In more detail, the memory 240 may store the information about the grade of the image forming apparatus 200. Objects that may be stored in the memory 240 are not limited to the information about the grade of the image forming apparatus and may include information of the accumulated usage of supplies, information about the range of available grades of supplies, etc.

At operation S550, the image forming apparatus 200 may display information of at least one of the accumulated usage of supplies and the grade of the image forming apparatus 200. In more detail, the output unit included in the input and output unit 210 may display the information of at least one of the accumulated usage of supplies and the grade of the image forming apparatus 200. For example, the output unit may display the information that the current accumulated usage of supplies is 300000 dots, and the current image forming apparatus has the silver grade.

Also, the output unit may display information about a benefit which may be obtained at a current grade of the image forming apparatus, information about a benefit which may be obtained when the grade of the image forming apparatus rises by one grade, information about a usage of supplies necessary for a one-grade rise of the grade, etc.

For example, the output unit may display information that "the image forming apparatus having the silver grade, which is the current image forming apparatus, may use silver grade supplies and bronze grade supplies, and a 30% discount coupon may be provided to the user when the user purchases an image forming apparatus, information that "the image forming apparatus having the gold grade, the next grade, may use gold grade supplies, silver grade supplies, and bronze grade supplies, and a 50% discount coupon may be provided to the user when the user purchases an image forming apparatus," information that "in order to upgrade the current grade by one grade, 20000 dots of the supplies may need to be used by the user," etc.

Figure 6:
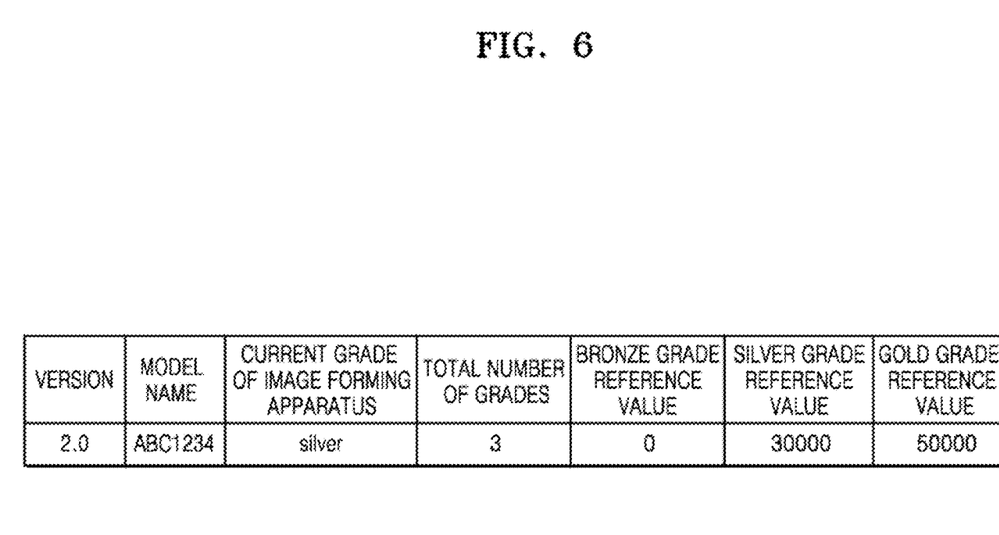
FIG. 6 illustrates apparatus grade classification information according to an embodiment of the present disclosure.

FIG. 6 illustrates the apparatus grade classification information according to an embodiment of the present disclosure.

According to an embodiment of the present disclosure, the apparatus grade classification information may include version information, model name information, information of a current grade of an image forming apparatus, information of the total number of grades, information of a reference value for each grade, etc., as illustrated in FIG. 6. For example, referring to FIG. 6, the apparatus grade classification information may include information that the current version is 2.0, that the model name is ABC1234, that the current image forming apparatus has the silver grade, that the total number of grades is 3, and that the reference value of the bronze grade is 0, the reference value of the silver grade is 30000, and the reference value of the gold grade is 50000. However, information included in the apparatus grade classification information is not limited thereto, and according to necessity, some of the exemplified information may not be included in the apparatus grade classification information.

Meanwhile, the unit of the usage of supplies may be determined based on user's setting, and the reference value for each of the grades may vary according to the unit of the usage of supplies. An example method of setting the unit of the usage of supplies may include a method of using a 5% pattern count and a method of using a used percentage.

According to an embodiment of the present disclosure, the method of using the 5% pattern count is a method that sets the number of dots used in 5% pattern printing as the unit of the usage of supplies. 5% pattern is a term indicating an average amount of supplies used in print materials. Thus, the 5% pattern count which is obtained by dividing the accumulated number of used dots of supplies by the number of dots used in 5% pattern printing may provide information about the accumulated number of pages of the printed materials.

For example, it may be assumed that the number of dots used in 5% pattern printing is 1000. When the accumulated number of used dots of supplies is 20000000, 5% pattern count is 20000000/1000=20000. When it is assumed that the reference values illustrated in FIG. 6 have the unit of the 5% pattern count, the image forming apparatus 200 may determine that the current grade of the image forming apparatus 200 corresponds to the bronze grade (therefore, 0 (the reference value of the bronze grade)<20000 (the current accumulated usage of supplies)<30000 (the reference value of the silver grade).

According to an embodiment of the present disclosure, the method of using the used percentage is a method that calculates how much the current accumulated usage of supplies of the image forming apparatus 200 accounts for with respect to the total capacity of the supplies. For example, when the current accumulated usage of supplies of the image forming apparatus 200 is 5000000 dots, and the total capacity of the supplies mounted in the image forming apparatus 200 is 1000000 dots, it is the used percentage=5000000/1000000*100=500%.

Meanwhile, the method of setting the unit of the usage of supplies is not limited to the method of using the 5% pattern count and the method of using the used percentage, described above. Also, the method of setting the unit of the usage of supplies may vary according to user's setting or information received from the server.

Figure 7:
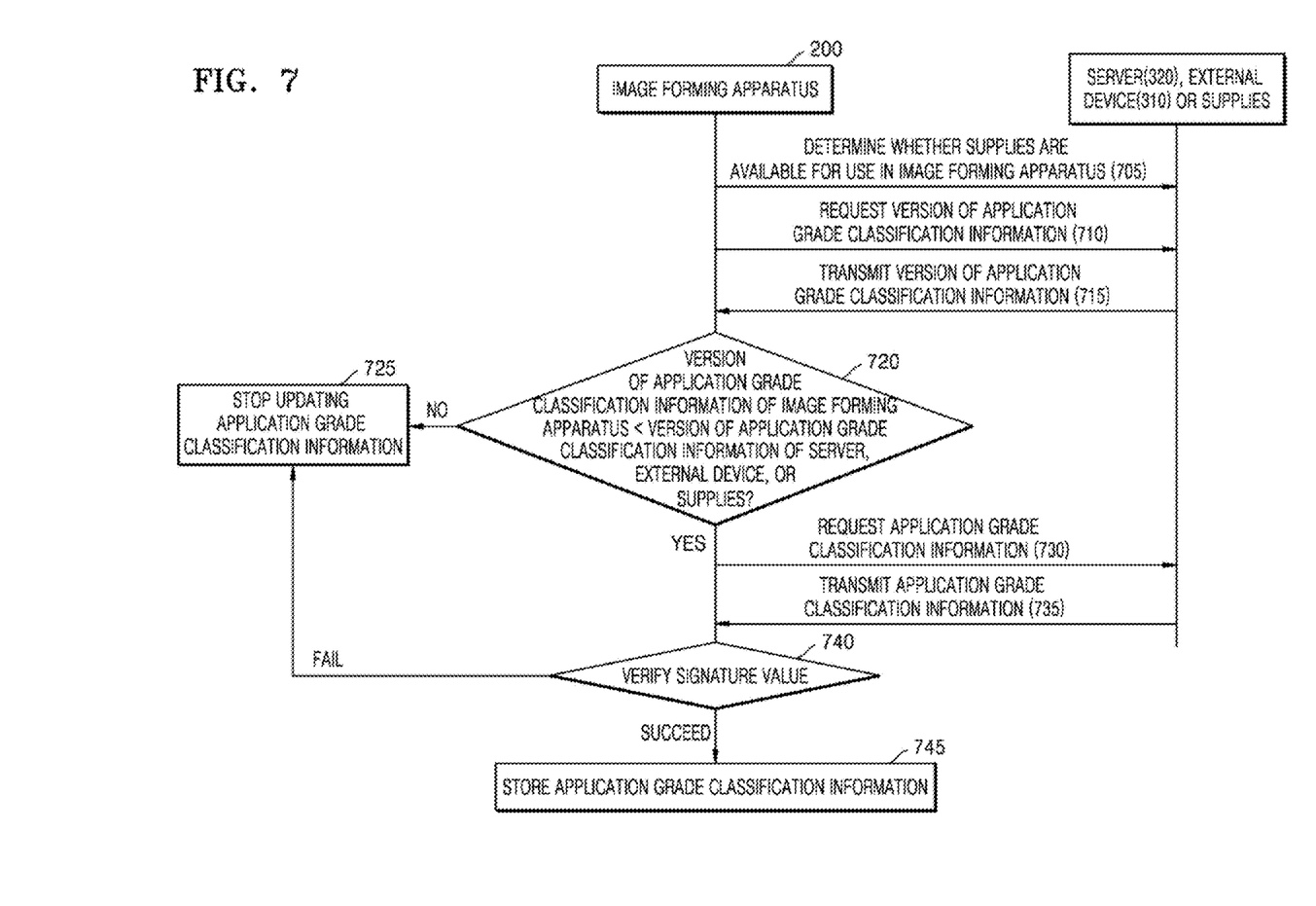
FIG. 7 is a flowchart of a process of updating apparatus grade classification information according to an embodiment of the present disclosure.

FIG. 7 is a flowchart of a process of updating the apparatus grade classification information according to an embodiment of the present disclosure.

At operation S705, the image forming apparatus 200 may determine whether supplies are available for use in the image forming apparatus 200. Operation S705 may be performed in the case in which the apparatus grade classification information is updated by the mounted supplies, and operation S705 may be omitted in the case in which the apparatus grade classification information is updated by the server 320 or the external device 310.

Descriptions about determining whether the supplies are available for use in the image forming apparatus 200 were already given with reference to FIG. 5, and thus, they will not be described in detail.

At operation S710, the image forming apparatus 200 may request a version of the apparatus grade classification information from the server 320, the external device 310, or the supplies. In other words, the image forming apparatus 200 may transmit information requesting the version of the apparatus grade classification information to the server 320, the external device 310, or the supplies.

At operation S715, the server 320, the external device 310, or the supplies may transmit the version of the apparatus grade classification information to the image forming apparatus 200.

At operation S720, the image forming apparatus 200 may compare apparatus grade classification information pre-stored in the image forming apparatus 200 with the version of the apparatus grade classification information received from the server 320, the external device 310, or the supplies.

According to an embodiment of the present disclosure, when the version of the apparatus grade classification information received from the server 320, the external device 310, or the supplies is determined to be a more previous version (or a lower version) than the apparatus grade classification information pre-stored in the image forming apparatus 200, the image forming apparatus 200 may stop updating the apparatus grade classification information at operation S725.

According to an embodiment of the present disclosure, when the version of the apparatus grade classification information received from the server 320, the external device 310, or the supplies is determined to be a more recent version (or a higher version) than the apparatus grade classification information pre-stored in the image forming apparatus 200, the image forming apparatus 200 may request the apparatus grade classification information from the server 320, the external device 310, or the supplies at operation S730. At operation S735, the server 320, the external device 310, or the supplies may transmit the apparatus grade classification information to the image forming apparatus 200.

At operation S740, the image forming apparatus 200 may verify a signature value with respect to the apparatus grade classification information received from the server 320, the external device 310, or the supplies. When the verification of the signature value succeeds, the process may proceed to operation S745, and when the verification of the signature value fails, the image forming apparatus 200 may stop updating the apparatus grade classification information at operation S725.

At operation S745, the image forming apparatus 200 may update the pre-stored apparatus grade classification information as the apparatus grade classification information received from the server 320, the external device 310, or the supplies and store the updated apparatus grade classification information.

Figure 8:
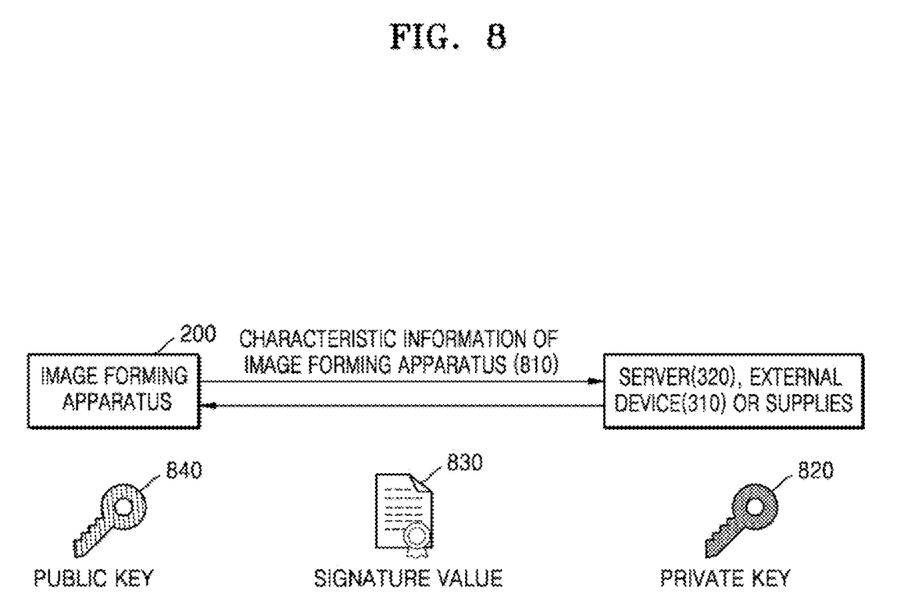
FIG. 8 illustrates a process of protecting device characteristic information according to an embodiment of the present disclosure.

FIG. 8 illustrates a process of protecting device characteristic information according to an embodiment of the present disclosure.

Referring to FIG. 8, the term "an asymmetric key algorithm" denotes an encryption algorithm requiring two different types of keys when encrypting and decrypting specific information. The two different types of keys may be a public key and a private key.

According to an embodiment of the present disclosure, the public key and the private key may be stored in different devices or different storage spaces. For example, a private key 820 may be stored in the server 320, the external device 310, or the supplies and a public key 840 may be stored in the image forming apparatus 200. The image forming apparatus 200 may transmit image forming apparatus characteristic information 810 to the server 320, the external device 310, or the supplies, in order to protect the image forming apparatus characteristic information 810. The server 320, the external device 310, or the supplies may sign the received image forming apparatus characteristic information 810 by using the private key 820, and transmit a signature value 830 to the image forming apparatus 200. The image forming apparatus 200 may store the received signature value 830 in the memory 240 together with the image forming apparatus characteristic information 810, and when the image forming apparatus characteristic information 810 becomes necessary later, may use the image forming apparatus characteristic information 810 after passing through the process of verifying the signature value by using the public key 840.

The image forming apparatus characteristic information 810 may include at least one of an accumulated usage of supplies and a grade of the image forming apparatus 200. However, an object included in the image forming apparatus characteristic information 810 is not limited thereto.

Alternatively, a public key and a private key may be stored in one device or one storage space. In this case, there is no need to transmit the image forming apparatus characteristic information 810 to another device or space for signature, and the signature using the private key and the verification of the signature value using the public key may be performed in one device or one storage space.

Figure 9:
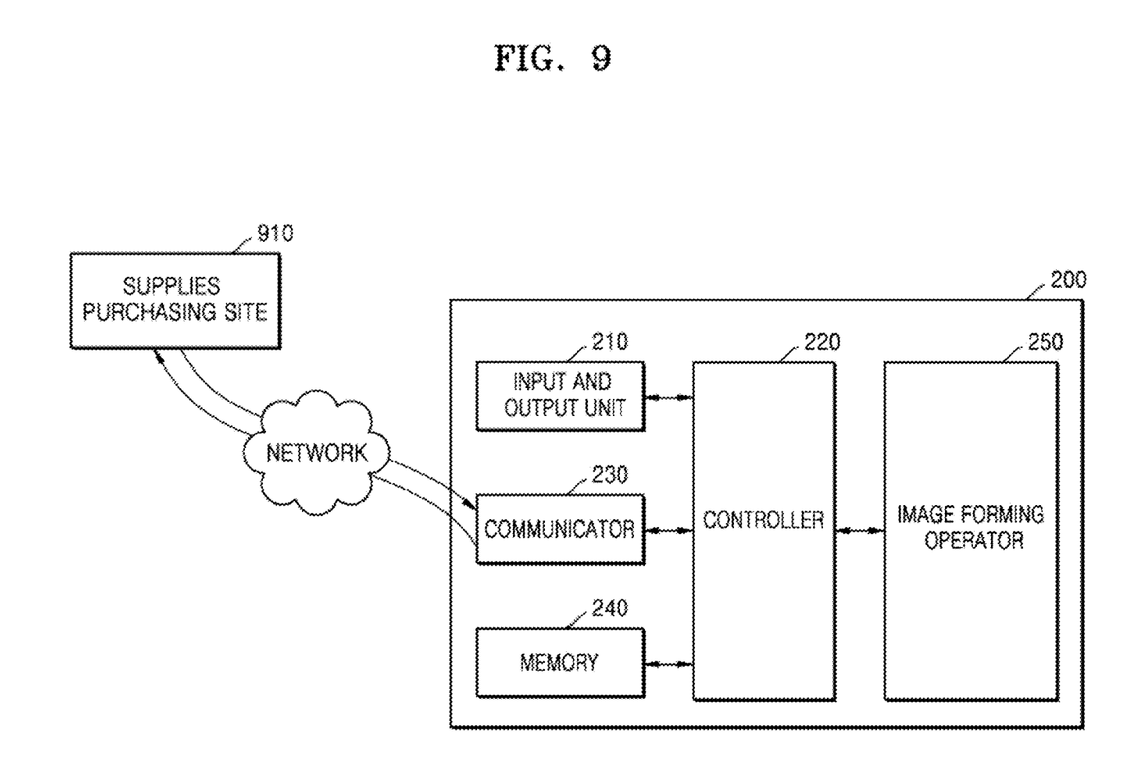
FIG. 9 illustrates a process of purchasing supplies by using an image forming apparatus according to an embodiment of the present disclosure.

FIG. 9 illustrates a process of purchasing supplies by using the image forming apparatus 200 according to an embodiment of the present disclosure.

According to an embodiment of the present disclosure, the image forming apparatus 200 may receive information about supplies purchasing from a supplies purchasing site 910 via a network. In more detail, the communicator 230 may receive information about supplies purchasing from the supplies purchasing site 910 via the network. The information about the supplies purchasing may include, for example, the types of supplies available for purchase, prices of the supplies, manufacturers of the supplies, model names of the supplies, etc.

The information about the supplies purchasing received by the communicator 230 may be transmitted to the output unit (included in the input and output unit 210) via the controller 220. The output unit may show a user the information about the supplies purchasing by displaying the information about the supplies purchasing. The user may input user input information via the input unit (included in the input and output unit 210), by referring to the information about the supplies purchasing displayed on the output unit. The user input information may include, for example, information about the model and the quantity of the supplies that are aimed to be purchased. The user input information may be transmitted to the supplies purchasing site 910, from the input and output unit 210 through the controller 220 and the communication, via the network.

It will be understood that the embodiments described above are not limiting of the scope of the present disclosure. For example, each component described in a single type may be executed in a distributed manner, and components described distributed may also be executed in an integrated form.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image forming apparatus using supplies mounted in the image forming apparatus, the image forming apparatus comprising:
    at least one computer processor to:
        determine a grade of the image forming apparatus based on an accumulated usage of the supplies, and
        determine a range of available grades of the supplies based on the determined grade of the image forming apparatus;
    a memory to store information about the grade of the image forming apparatus;
    a transceiver to:
        transmit a purchase request for the supplies to a supply purchasing site, the purchase request including the information about the grade of the image forming apparatus,
        receive a response to the purchase request from the supply purchasing site, the response to the purchase request corresponding to a comparison of the information about the grade of the image forming apparatus and a grade of the requested supplies, and
        receive a version of apparatus grade classification information of at least one of a server, an external device, or the supplies,
        wherein, when a version of pre-stored apparatus grade classification information is lower than the version of the apparatus grade classification information of the at least one of the server, the external device, or the supplies, the at least one computer processor controls the transceiver to receive the apparatus grade classification information of the at least one of the server, the external device, or the supplies; and
    a touch screen to display the information about the grade of the image forming apparatus and information about increasing the grade of the image forming apparatus,
    wherein, when the grade of the image forming apparatus is greater than or equal to the grade of the requested supplies, the supply purchasing site authorizes the requested purchase.

2. The image forming apparatus of claim 1, wherein the at least one computer processor determines the grade of the image forming apparatus based on the accumulated usage and the pre-stored apparatus grade classification information.

3. The image forming apparatus of claim 1, wherein the accumulated usage is calculated by using a ratio of an accumulated number of dots that are used in the supplies to a number of dots used in 5% pattern printing, or by using a ratio of the accumulated number of dots that are used in the supplies to the number of dots representing a total capacity of the supplies.

4. The image forming apparatus of claim 1, wherein the at least one computer processor determines a wider range of available grades of the supplies, as the determined grade of the image forming apparatus increases.

5. The image forming apparatus of claim 1, wherein the at least one computer processor determines whether the supplies are available for use in the image forming apparatus.

6. The image forming apparatus of claim 1, wherein the transceiver transmits information of at least one of the accumulated usage of the supplies and the grade of the image forming apparatus to at least one of the server or the external device.

7. The image forming apparatus of claim 1, wherein the touch screen displays information of the accumulated usage of the supplies.

8. The image forming apparatus of claim 1,
    wherein, when the memory which stores at least one of the accumulated usage of the supplies and the grade of the image forming apparatus stores the accumulated usage of the supplies, the memory further stores a signature value of the accumulated usage of the supplies together with the accumulated usage of the supplies, and
    wherein, when the memory which stores the at least one of the accumulated usage of the supplies and the grade of the image forming apparatus stores the grade of the image forming apparatus, the memory further stores a signature value of the grade of the image forming apparatus together with the grade of the image forming apparatus.

9. A method of an image forming apparatus using supplies mounted in the image forming apparatus, the method comprising:
    determining a grade of the image forming apparatus based on an accumulated usage of the supplies;
    determining a range of available grades of the supplies based on the determined grade of the image forming apparatus;
    storing information about the grade of the image forming apparatus;
    transmitting a purchase request for the supplies to a supply purchasing site, the purchase request including the information about the grade of the image forming apparatus;
    receiving a response to the purchase request from the supply purchasing site, the response to the purchase request corresponding to a comparison of the information about the grade of the image forming apparatus and a grade of the requested supplies;
    receiving a version of apparatus grade classification information of at least one of a server, an external device, or the supplies;
    when a version of pre-stored apparatus grade classification information is lower than the version of the apparatus grade classification information of the at least one of the server, the external device, or the supplies, receiving the apparatus grade classification information of the at least one of the server, the external device, or the supplies; and
    displaying the information about the grade of the image forming apparatus and information about increasing the grade of the image forming apparatus,
    wherein, when the grade of the image forming apparatus is greater than or equal to the grade of the requested supplies, the supply purchasing site authorizes the requested purchase.

10. The method of claim 9, wherein the determining of the grade of the image forming apparatus comprises determining the grade of the image forming apparatus based on the accumulated usage and the pre-stored apparatus grade classification information.

11. The method of claim 9, wherein the accumulated usage is calculated by using a ratio of the accumulated number of dots that are used in the supplies to a number of dots used in 5% pattern printing, or by using a ratio of the accumulated number of dots that are used in the supplies to the number of dots representing a total capacity of the supplies.

12. The method of claim 9, further comprising:
determining a wider range of available grades of the supplies, as the determined grade of the image forming apparatus increases.

13. The method of claim 9, further comprising:
determining whether the supplies are available for use in the image forming apparatus.

14. The method of claim 9, further comprising:
transmitting information of at least one of the accumulated usage of the supplies and the grade of the image forming apparatus to at least one of the server or the external device.

15. The method of claim 9, further comprising:
displaying information of the accumulated usage of the supplies.

16. The method of claim 9, further comprising:
storing at least one of the accumulated usage of the supplies and the grade of the image forming apparatus,
wherein, when storing the accumulated usage of the supplies, storing a signature value of the accumulated usage of the supplies together with the accumulated usage of the supplies; and
wherein, when storing the grade of the image forming apparatus, storing a signature value of the grade of the image forming apparatus together with the grade of the image forming apparatus.

17. A non-transitory computer-readable recording medium having recorded thereon instructions executable by a processor, the non-transitory computer-readable recording medium comprising:
instructions to determine a grade of the image forming apparatus based on an accumulated usage of the supplies;
instructions to determine a range of available grades of the supplies based on the determined grade of the image forming apparatus;
instructions to store information about the grade of the image forming apparatus;
instructions to transmit a purchase request for the supplies to a supply purchasing site, the purchase request including the information about the grade of the image forming apparatus;
instructions to receive a response to the purchase request from the supply purchasing site, the response to the purchase request corresponding to a comparison of the information about the grade of the image forming apparatus and a grade of the requested supplies;
instructions to receive a version of apparatus grade classification information of at least one of a server, an external device, or the supplies;
instructions to, when a version of a pre-stored apparatus grade classification information is lower than the version of the apparatus grade classification information of the at least one of the server, the external device, or the supplies, receive the apparatus grade classification information of the at least one of the server, the external device, or the supplies; and
instructions to display the information about the grade of the image forming apparatus and information about increasing the grade of the image forming apparatus,
wherein, when the grade of the image forming apparatus is greater than or equal to the grade of the requested supplies, the supply purchasing site authorizes the requested purchase.

* * * * *